(12) United States Patent
Sponheimer et al.

(10) Patent No.: US 11,267,355 B2
(45) Date of Patent: Mar. 8, 2022

(54) METHOD FOR CHARGING A MOTOR VEHICLE AND MOTOR VEHICLE

(71) Applicant: Ford Global Technologies, LLC, Dearborn, MI (US)

(72) Inventors: Arnulf Sponheimer, Kornwestheim (DE); Stephan Strahl, Bodenwöhr (DE)

(73) Assignee: Ford Global Technologies, LLC, Dearborn, MI (US)

( * ) Notice: Subject to any disclaimer, the term of this patent is extended or adjusted under 35 U.S.C. 154(b) by 229 days.

(21) Appl. No.: 16/383,175

(22) Filed: Apr. 12, 2019

(65) Prior Publication Data

US 2019/0315242 A1 Oct. 17, 2019

(30) Foreign Application Priority Data

Apr. 13, 2018 (DE) .......................... 102018205625.0

(51) Int. Cl.
*B60L 53/30* (2019.01)
*B60L 53/36* (2019.01)
(Continued)

(52) U.S. Cl.
CPC ............. *B60L 53/305* (2019.02); *B60L 53/36* (2019.02); *B60L 53/64* (2019.02); *B60L 53/665* (2019.02);
(Continued)

(58) Field of Classification Search
CPC ...... B60L 53/305; B60L 53/36; B60L 53/665; B60L 53/64; B60L 2240/72;
(Continued)

(56) References Cited

U.S. PATENT DOCUMENTS 7,999,506 B1 * 8/2011 Hollar ..................... B60L 53/35
320/104
8,717,170 B1 5/2014 Juhasz
(Continued)

FOREIGN PATENT DOCUMENTS

| CN | 102009625 B | 4/2012 | |
| CN | 105691230 A | 6/2016 | |
| WO | WO-2017092817 A1 * | 6/2017 | ............. G07F 15/00 |

OTHER PUBLICATIONS

Cao, et al., "A Reservation Based Charging Management for On-the-move EV Under Mobility Uncertainty," 2015 IEEE Online Conference on Green Communications (OnlineGreenComm), Piscataway, NJ, 2015, pp. 11-16. doi: 10.1109/OnlineGreenCom.2015.7387372.

(Continued)

*Primary Examiner* — Stacy Whitmore
(74) *Attorney, Agent, or Firm* — Brandon Hicks; Eversheds Sutherland (US) LLP

(57) ABSTRACT

A charging method (10) for an electrically operated motor vehicle (30) designed for autonomous driving is provided, in which, in a first exercise, the motor vehicle (30) is charged in a charging procedure (22) within a time window at a charging station (4). According to the invention, the motor vehicle (30) is commanded in an approach command delivery (19) to approach (6) the charging station (4) or in a (Continued)

departure command delivery (24) to depart (7) from the charging station (4). Moreover, a motor vehicle (30) is claimed.

10 Claims, 3 Drawing Sheets

(51) Int. Cl.
  *B60L 53/66* (2019.01)
  *B60L 53/64* (2019.01)
(52) U.S. Cl.
  CPC ....... *B60L 2240/72* (2013.01); *B60L 2240/80* (2013.01); *B60L 2260/32* (2013.01); *Y02T 90/167* (2013.01)
(58) Field of Classification Search
  CPC .. B60L 2240/80; B60L 2260/32; B60L 53/66; Y02T 90/167; Y02T 90/12; Y02T 10/7072; Y02T 10/70; Y02T 90/16; Y04S 30/14
  See application file for complete search history.

(56) References Cited

U.S. PATENT DOCUMENTS

| | | | |
|---|---|---|---|
| 9,581,997 B1* | 2/2017 | Penilla | B60L 53/80 |
| 2014/0089095 A1* | 3/2014 | Bennett | G06Q 30/0271 |
| | | | 705/14.64 |
| 2017/0129349 A1* | 5/2017 | Solomon | G07C 9/27 |
| 2017/0140349 A1* | 5/2017 | Ricci | B60L 53/665 |
| 2018/0238698 A1* | 8/2018 | Pedersen | G05D 1/0278 |
| 2019/0009679 A1* | 1/2019 | Gaither | B60L 11/182 |
| 2019/0016384 A1* | 1/2019 | Carlson | B60W 30/00 |
| 2019/0160958 A1* | 5/2019 | Chaudhary | G06Q 10/06315 |
| 2019/0255963 A1* | 8/2019 | Goei | B60L 53/67 |
| 2019/0283616 A1* | 9/2019 | Upward | B60L 53/126 |
| 2019/0315240 A1* | 10/2019 | Wu | H02J 50/10 |
| 2021/0011485 A1* | 1/2021 | Chiappetta | A47L 9/2894 |

OTHER PUBLICATIONS

Spacevertex. (Nov. 13, 2014). Autonomous Autopilot Capability activation in Charging Stations (8 pages). Retrieved from https://forums.tesla.com/forum/forums/autonomous-autopilot-capability-activation-charging-stations.

* cited by examiner

METHOD FOR CHARGING A MOTOR VEHICLE AND MOTOR VEHICLE

CROSS-REFERENCE TO RELATED APPLICATIONS

This application claims priority to and the benefit of German patent application No. 102018205625.0, filed Apr. 13, 2018, which is hereby incorporated by reference herein in its entirety.

The present invention relates to a charging method for an electrically operated motor vehicle designed for autonomous driving.

CN 105691230 A discloses an autonomous electric automobile having an automatic navigation system, an automatic charging system, and an automatic driving system. The automatic driving system is used to achieve driverless driving of the electric automobile. The automatic navigation system is used for automatic locating of charging stations in the vicinity of the electric automobile. The automatic charging system is used to automatically charge the electric automobile after the electric automobile has been driven in a driverless manner to nearby charging stations.

U.S. Pat. No. 9,581,997 B1 discloses methods, computer systems, and servers to navigate a vehicle automatically from a present location to a destination location, with or without human operator, who controls the primary navigation of the vehicle. One method of U.S. Pat. No. 9,581,997 B1 comprises the identification of a vehicle location and the determination as to whether the vehicle location is in the vicinity of a self-park location. The method accesses mapping data for the self-park location and receives a request to initiate a self-park process for the vehicle. The method furthermore comprises instructions to the vehicle to continue with the self-park process. The self-park process is used to control the vehicle in order to move automatically from a present location to a destination location. The present location and the destination location are dynamically updated if the present location of the vehicle changes and based on conditions of the destination location. Vehicles can be dropped off, registered for self-parking via a smart phone, and the vehicle moves to a free parking space.

A method for managing queues for electric vehicle charging stations (EVCS) and an EVCS queue management system are disclosed in U.S. Pat. No. 8,717,170 B1. The method comprises restricting access to the EVCS to a person at the front of an EVCS queue during a changeover time. The changeover time can be predetermined or generated based on data which relate to the management of the queue and/or the vehicle of the user at the front of the queue. If the user at the front of the queue does not activate the EVCS during the changeover time, the next in the queue receives a changeover time in which the EVCS is to be reached. If the queue is otherwise empty, the user at the front of the queue will be notified that the EVCS is no longer reserved and anyone can use the EVCS.

The present invention is based on the object of providing an improved charging method for an electrically operated motor vehicle.

This object is achieved by a charging method as claimed in claim 1. Advantageous refinements of the invention are specified in the dependent claims.

In the charging method according to the invention for an electrically operated motor vehicle designed for autonomous driving, in a first exercise, the motor vehicle is charged in a charging procedure within a time window at a charging station. According to the invention, the motor vehicle is commanded in an approach command delivery to approach the charging station or in a departure command delivery to depart from the charging station. In particular, both the approach command delivery and also the departure command delivery are carried out.

By taking over the control of the motor vehicle, the charging of the autonomously driving motor vehicle can be carried out comfortably, without inconvenience for the user.

In one advantageous embodiment of the charging method according to the invention, a charging station offer is delivered to the motor vehicle in a charging station offer delivery and it is checked in an acceptance check whether the charging station offer was confirmed at the motor vehicle. The command delivery is then carried out under the condition that the charging station offer was confirmed at the motor vehicle, i.e., by the motor vehicle or an operator of the motor vehicle.

The reconciliation with the customer can thus be performed in a simple manner and in particular a consent of the customer for taking over the control of the motor vehicle can be obtained, if this is not already provided.

In a further advantageous embodiment of the charging method according to the invention, the charging station is selected from multiple stored charging stations in a charging station determination.

The coordination of the charging stations can thus be improved. Traffic between the stored charging stations can be avoided.

In a further advantageous embodiment of the charging method according to the invention, in the charging station determination, the charging station is selected which is in a specific relationship to the present position of the motor vehicle. The relationship is in particular a distance or a travel time to the charging station.

The charging station most suitable for the motor vehicle is thus selected.

In a further advantageous embodiment of the charging method according to the invention, the charging station offer comprises a price for the charging procedure. In particular, the price is variable in this case and price determination is carried out in the charging station determination, in which the price for the charging procedure is established.

The demand can thus be controlled and the utilization of the charging stations can be improved.

In a further advantageous embodiment of the charging method according to the invention, the charging procedure is carried out by means of a robot.

The motor vehicle can thus be driverless. The comfort is enhanced for a motor vehicle having a driver.

In a further advantageous embodiment of the charging method according to the invention, a destination location is assigned to the motor vehicle after the charging procedure in a destination location assignment. This destination location ideally corresponds to the starting position, from which the motor vehicle is started for the purpose of charging.

The motor vehicle can thus drive to a free parking space close to the starting position and stop by parking therein. The charging method is not linked to any further changeovers during the use of the motor vehicle.

The motor vehicle according to the invention has an electric drive and is designed to drive autonomously and to receive and execute an approach command or a return command.

The motor vehicle can thus advantageously be used in the charging method according to the invention.

Further advantages of the present invention are apparent from the detailed description and the figures. The invention will be explained in greater detail on the basis of the figures and the following description. In the figures.

Figure 1:
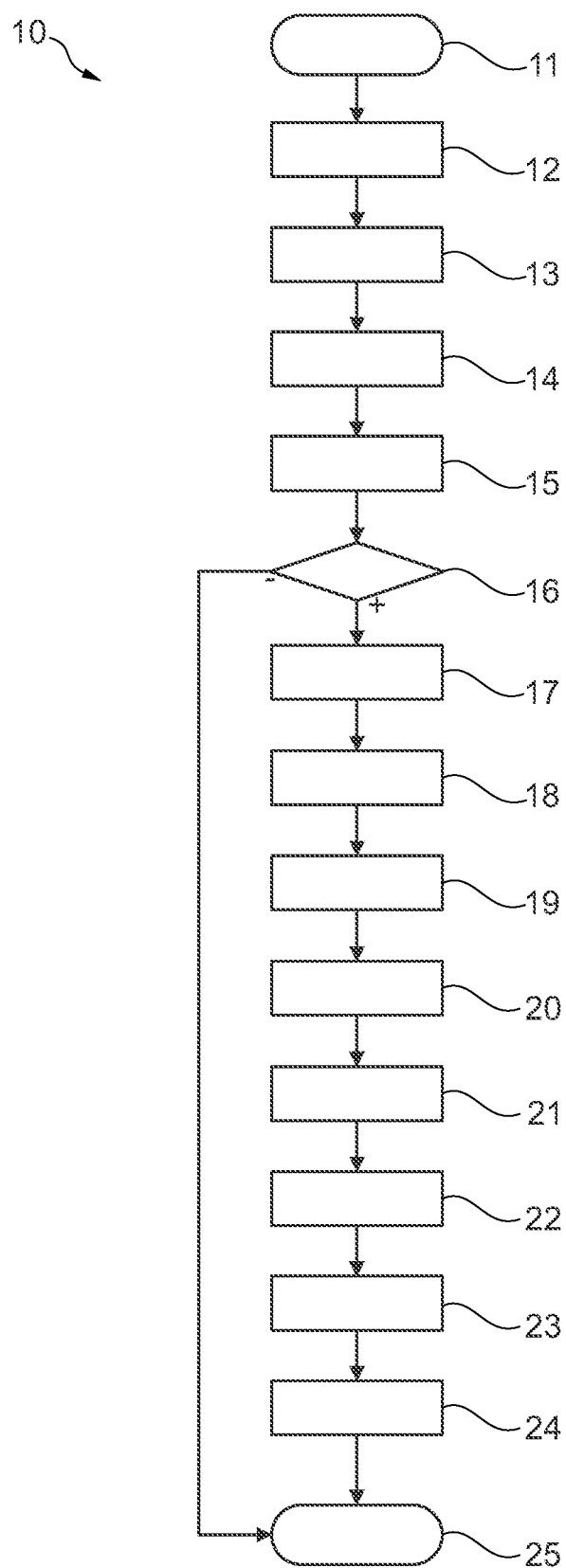
FIG. 1 shows a charging method according to the invention in an exemplary embodiment.

In FIG. 1, the charging method 10 according to the invention is schematically shown in an exemplary embodiment from a start 11 up to an end 25. The charging method is carried out in particular by a charging method control unit 2. The charging method 10 comprises multiple method steps 12 to 24, which can also be carried out in a sequence other than that shown. The charging method 10 according to the invention comprises in particular two exercises. The charging method 10 according to the invention is designed in a first exercise to charge an accumulator of an electrically driven motor vehicle 30 with electrical energy. For this purpose, the motor vehicle 30 is charged in a charging procedure 22 in the first exercise of the charging method 10. The charging procedure 22 takes place at a specific charging station 4 and within a specific time window. The time window is preferably reserved beforehand for the motor vehicle 30 in a reservation 17.

In particular, after the start 11 of the charging method 10, a charging request reception 12 is carried out, in which a charging request of the motor vehicle 30 is received. The charging request can already comprise data of the motor vehicle 30 in this case, for example, a required amount of energy, a state of charge (SoC) of the accumulator, a desired or preferred time window, a desired or preferred charging technology, a price upper limit, a compatibility, a desired or preferred electricity supplier, and/or a present position. The charging request can have been delivered by a person 1 or by the motor vehicle 30.

The charging method 10 comprises in particular a position determination 13, in which the present position of the motor vehicle 30 is determined, if the present position has not already been received with the charging request. For the position determination 13, for example, a position request is carried out, in which the motor vehicle 30 transmits its present position. The present position of the motor vehicle 30 is established in particular in a routine manner by means of a satellite system 3.

After the charging request and the present position of the motor vehicle 30 are known, in particular a charging station determination 14 is carried out, in which the charging station 4 is selected from multiple stored charging stations. The charging stations are stored in particular in a database. In the charging station determination 14, the charging station 4 at which the charging procedure 22 is to be carried out is determined. In particular the charging station 4 is selected in this case which is in a specific relationship to the present position of the motor vehicle 30. The relationship is, for example, the distance or the travel time of the motor vehicle 30 to the charging station 4. Further factors can also be taken into consideration in the selection of the charging station, for example, the required amount of energy, the desired or preferred time window, the desired or preferred charging technology, the price upper limit, the compatibility, and/or the desired or preferred electricity supplier.

The charging station determination 14 comprises in particular a price calculation, in which the price is determined as a function of the offer and the demand in such a way that in the case of a lower ratio of offer to demand, the price is higher than in the case of a higher ratio of offer to demand.

After the charging station determination 14, a charging station offer delivery 15 is performed and a charging station offer is transmitted to the motor vehicle 30 or the motor vehicle operator, who is in particular the person 1. The charging station offer includes, for example, the charging station 4, the time window, a consent request for commanding the motor vehicle 30, the charging station location, a route to the charging station, a predicted charging duration, the price, the charging technology, and/or the supplier.

After the charging station offer delivery 15, in particular an acceptance check 16 is carried out, in which it is checked whether the charging station offer was accepted at the motor vehicle, i.e., by the motor vehicle 30 or by its operator, in particular whether the consent to command the motor vehicle 30 was given. If the charging station offer was accepted at the motor vehicle, in the first exercise of the charging method 10, a next method step 17, 18, 19, 20 is then carried out. If the charging station offer was not accepted at the motor vehicle, the charging method is ended in a second exercise after the acceptance check 16.

As the next method step, for example, a reservation 17 is carried out, in which the charging station 4 and the time window for the motor vehicle 30 are reserved.

After the acceptance check 16 or after the reservation 17, in particular a confirmation delivery 18 is carried out, in which a confirmation is transmitted to the motor vehicle 30 or the motor vehicle operator. The reservation is confirmed with the confirmation. In addition, the confirmation can contain further items of information, for example, a charging code, a route to the charging station, and/or a starting time for an approach 6.

In an approach command delivery 19, which is carried out, for example, after the reservation 17 or after the confirmation delivery 18 or simultaneously with the confirmation delivery 18, an approach command is issued to the motor vehicle 30. The approach command comprises in particular a starting time for the approach 6 or an arrival time at the charging station 4. The approach 6 of the motor vehicle 30 from a starting position 5 to the charging station 4 is thus initiated. The starting position 5 of the motor vehicle 30 is in this case the present position of the motor vehicle 30, which the motor vehicle 30 has at the start of the approach 6.

If the motor vehicle 30 is autonomously driven to the charging station 4, as the next method step, the motor vehicle 30 is received, in particular in a motor vehicle reception 20, at the charging station 4. In this case, the arrival of the motor vehicle 30 is registered.

A data transfer (handshake) 21 is carried out in particular thereafter, during which data are received from the motor vehicle 30. These data comprise, for example, the charging code, the amount of energy required, the desired or preferred charging technology, and/or the compatibility.

The charging procedure 22 is subsequently carried out. The charging procedure 22 is performed in particular by means of induction. The charging procedure 22 is moreover carried out automatically by means of a robot in particular. The robot establishes an electrical connection to the motor vehicle 30 at the beginning of the charging method 22 for this purpose and disconnects it at the end of the charging procedure 22.

After the charging procedure 22, a destination location assignment 23 can be performed. In this case, a destination location is assigned to the motor vehicle 30, which the motor vehicle 30 can drive to after the charging procedure 22. The destination location is preferably the starting position 5 of the motor vehicle 30. With the destination location assignment 23, further items of information can be transmitted to the motor vehicle 30 or the motor vehicle operator, for example, an invoice for the charging procedure 22 and/or a route to the destination location.

Before the end 25 of the charging method 10, in particular a departure command delivery 24 is carried out. In this case, a departure command is issued to the motor vehicle 30. The departure 7 of the motor vehicle 30 from the charging station 4, in particular to the destination location, is thus initiated.

Figure 2:
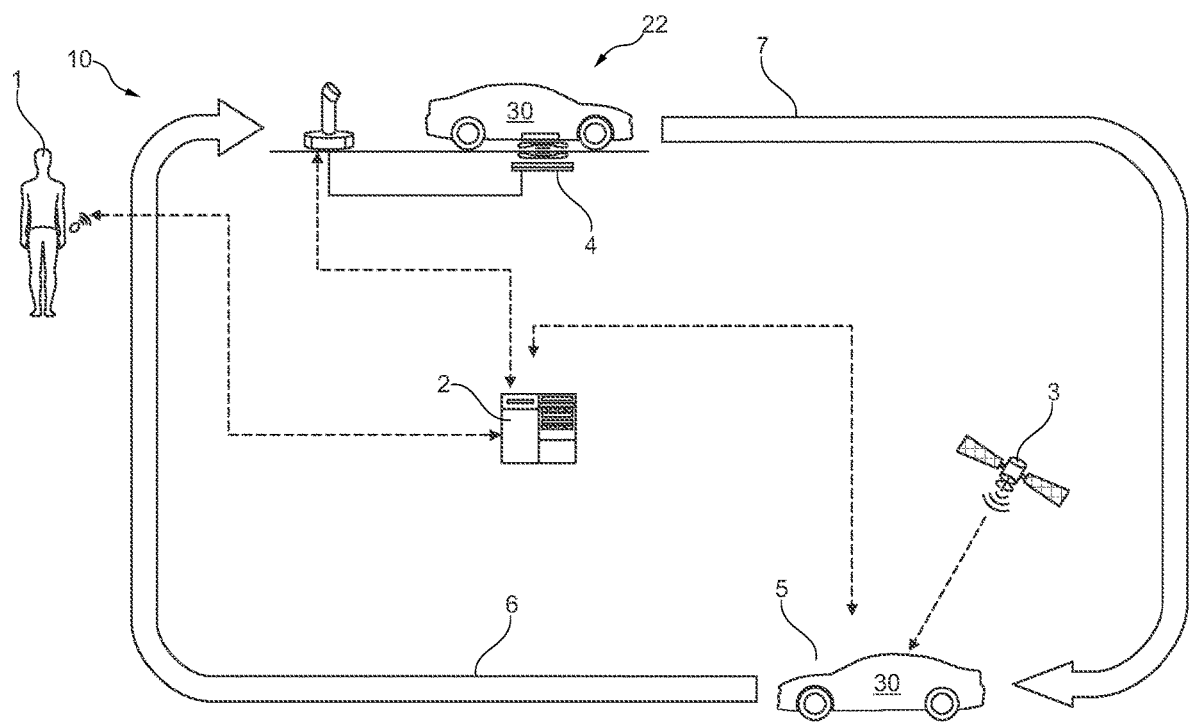
FIG. 2 shows the charging method in interaction with a motor vehicle according to the invention.

In FIG. 2, the charging method 10 according to the invention is schematically shown by way of example in interaction with a motor vehicle 30 according to the invention.

For this purpose, the person 1 issues the charging request, for example, by means of a mobile device. The mobile device is in particular a smart phone provided with a corresponding app. The charging request is received by the charging method control unit 2 upon the execution of the charging method 10 in the charging request reception 12. In the position determination 13 here, the present position of the motor vehicle 30 is determined in that the motor vehicle 30 determines its present position upon request of the charging method control unit 2 by means of the satellite navigation system 3 and transmits it to the charging method control unit 2. The communication between the person 1 and the charging method control unit 2 and also between the charging method control unit 2 and the motor vehicle 30 takes place in particular via a mobile wireless network, in particular GSM. After the data for the charging station 4, in particular its location and the starting time, are available to the motor vehicle 30, the approach command is delivered. After the delivery of the approach command, the motor vehicle 30 independently executes the approach 6 from the starting position 5 to the charging station 4, which was determined in the charging station determination 14. The motor vehicle 30 starts, for example, independently at a time established by the charging method control unit 2 and autonomously drives to the provided destination position of the charging station 4 via a route trajectory determined by an internal-vehicle navigation system.

Upon arriving at the charging station 4, the motor vehicle 30 positions itself in a suitable manner in relation to the charging station 4. After the handshake communication 21 between motor vehicle 30 and charging station 4 and completed fully automated coupling of a charging system of the motor vehicle 30, the charging procedure 22 begins.

After ending of the charging procedure 22, the motor vehicle 30 receives the departure command and independently starts the departure 7. The motor vehicle 30 travels in this case, for example, autonomously via a route trajectory determined by the internal-vehicle navigation system to the starting position 5. For example, the motor vehicle 30 determines a free parking space via short-range navigation, travels there, and stops there by parking.

Figure 3:
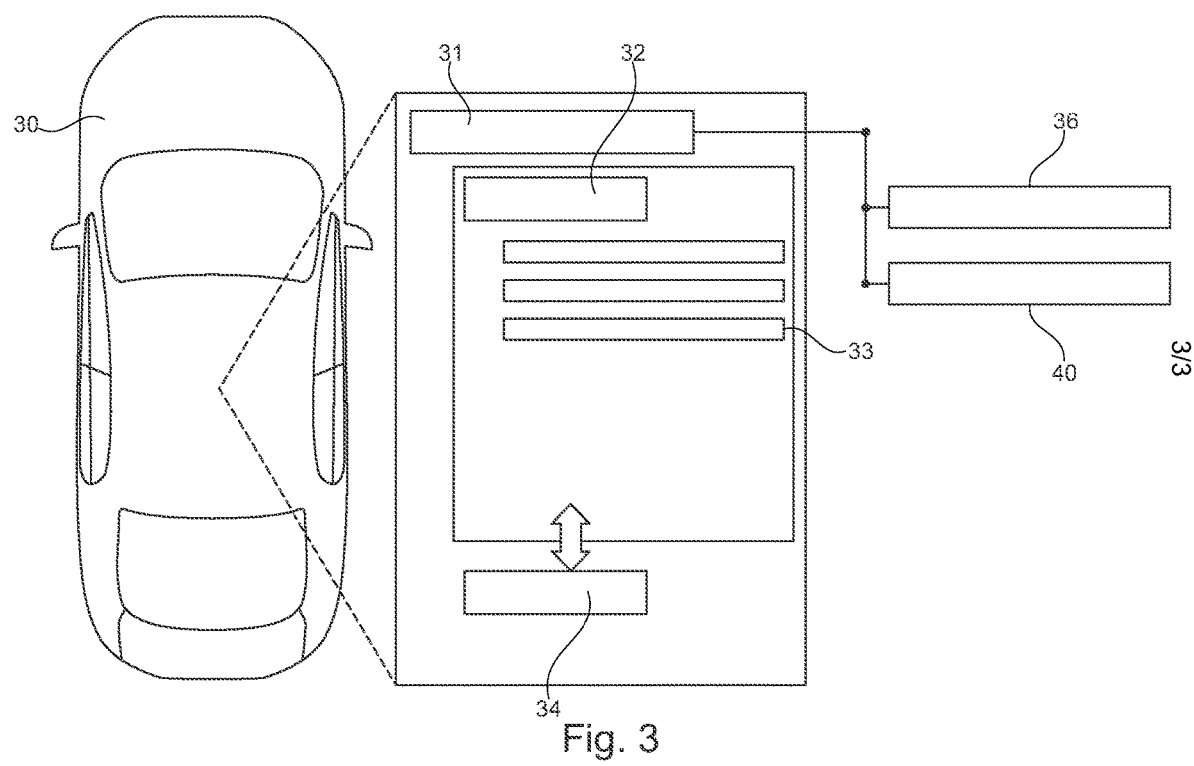
FIG. 3 shows the motor vehicle according to the invention in an exemplary design.

The motor vehicle 30 according to the invention is shown in FIG. 3. It has an electric drive and is designed to drive autonomously and to receive and follow the approach command and/or the departure command of the charging method 10.

For this purpose, the motor vehicle 30 comprises in particular a telematics unit 31, which is designed to control the required data acquisition and data communication with the charging method control unit 2 during the charging method 10.

The motor vehicle 30 comprises in particular a modem 34 for receiving the data request of the charging method control unit 2 via radio transmission (G4/G5 standard) and a proprietary communication protocol on an internal bus, by means of which the data requests are transmitted to a charging station communication program 33. The charging station communication program 33 is stored, for example, in a processor 32. The charging procedure 22 is controlled at the motor vehicle via the charging station communication program 33.

Upon the request for the GPS position determination, the charging station communication program 33 is designed to awaken a connected GPS module 40 via a CAN network, which GPS module, after completed position determination, transmits the present position back to the charging station communication program 33, which initially stores these data.

The request of the charging method control unit 2 also includes in particular the transmission of state of charge, maximum charging power, and battery capacity by the charging station communication program 33. This program communicates via CAN network with a battery control module 36, which reports back these data.

These data are subsequently transmitted via the modem 34 by radio standard to the charging method control unit 2, so that the charging method control unit 2 processes these data and after completion of the performed charge booking by the customer, determines the corresponding charging station 4 and/or its GPS coordinates and establishes the starting time. These data are then transmitted by radio to the motor vehicle 30.

By means of the data received via the modem 34, in particular the arrival time at the charging station 4, which are relayed to the charging station communication program 33, the motor vehicle 30 is designed, together with a navigation program in the telematics unit 31, to determine the required time at which the motor vehicle 30 starts and drives to the charging station 4 in order to reach the charging station 4 at the arrival time.

The motor vehicle 30 is designed to start all autonomous driving functions (programs, sensors, and actuators), initiated at the planned time via the charging station communication program 33, and the motor vehicle 30 drives independently to the planned charging station 4 via the route trajectory determined by the telematics module 31.

The motor vehicle 30 is designed to start after completed charging procedure 22 and to drive back independently to the originally stored GPS position. Upon arriving there, the motor vehicle 30 identifies via short-range navigation and corresponding sensors a free stopping place or parking place, approaches it, and stops there by parking.

Although the invention was illustrated and described in greater detail by the preferred exemplary embodiments, the invention is not thus restricted by the disclosed examples and other variations can be derived therefrom by a person skilled in the art without leaving the scope of protection of the invention.

The figures are not necessarily faithful to the details and to scale and can be shown enlarged or reduced in size in order to offer a better overview. Therefore, the functional details disclosed here are not to be understood as restrictive, but rather only as an illustrative foundation, which offers a person skilled in the art in this field of technology guidelines to use the present invention in manifold ways.

The expression "and/or" used here, when it is used in a series of two or more elements, means that each of the listed elements can be used alone, or any combination of two or more of the listed elements can be used. If, for example, a relationship is described which contains the components A, B, and/or C, the relationship can contain A alone; B alone;

C alone; A and B in combination; A and C in combination; B and C in combination; or A, B, and C in combination.

LIST OF REFERENCE NUMERALS 1 person
2 charging method control unit
3 satellite system
4 charging station
5 starting position
6 approach
7 departure
10 charging method
11 start
12 charging request reception
13 position determination
14 charging station determination
15 charging station offer delivery
16 acceptance check
17 reservation
18 confirmation delivery
19 approach command delivery
20 motor vehicle reception
21 data transmission
22 charging procedure
23 destination location assignment
24 departure command delivery
25 end
30 motor vehicle
31 telematics unit
32 processor
33 charging station communication program
34 modem
36 battery control unit
40 GPS module

The invention claimed is:

1. A charging method (10) for an electrically operated motor vehicle (30) configured for autonomous driving, the method comprising:
reserving a charging station (4) for the electrically operated motor vehicle (30);
transmitting a confirmation to the electrically operated motor vehicle (30), wherein the confirmation comprises at least a charging code, a route to the charging station, and a starting time for an approach (6);
charging the electrically operated motor vehicle (30) in a charging procedure (22) within a time window at the charging station (4); and
commanding the electrically operated motor vehicle (30) in an approach command delivery (19) to approach (6) the charging station (4) or in a departure command delivery (24) to depart (7) from the charging station (4),
wherein the charging station (4) is automatically selected from multiple stored charging stations based on the time window, a charging station offer, and a present position of the electrically operated motor vehicle (30).

2. The charging method (10) as claimed in claim 1, wherein, in a charging station offer delivery (15), the charging station offer is delivered to the electrically operated motor vehicle (30) and, in an acceptance check (16), it is checked whether the charging station offer was confirmed at the electrically operated motor vehicle, and wherein the approach and departure command deliveries (19, 24) are carried out under a condition that the charging station offer was confirmed at the electrically operated motor vehicle.

3. The charging method (10) as claimed in claim 1, wherein the charging station (4) is automatically selected from the multiple stored charging stations in a charging station determination (14).

4. The charging method (10) as claimed in claim 3, wherein, in the charging station determination (14), the charging station is selected which is in a specific relationship to the present position of the electrically operated motor vehicle (30).

5. The charging method (10) as claimed in claim 4, wherein the specific relationship is a distance or a travel time to the charging station (4).

6. The charging method (10) as claimed in claim 2, wherein the charging station offer comprises a price for the charging procedure (22).

7. The charging method (10) as claimed in claim 6, wherein the price is variable and a price determination is carried out in a charging station determination (14), in which the price for the charging procedure (22) is established.

8. The charging method (10) as claimed in claim 1, wherein the charging procedure (22) is carried out by a robot.

9. The charging method (10) as claimed in claim 1, wherein a destination location is assigned to the electrically operated motor vehicle after the charging procedure (22) in a destination location assignment (23).

10. The charging method as claimed in claim 1, wherein the electrically operated motor vehicle (30) is configured to drive autonomously and to receive and execute the approach command delivery or a return command delivery.

* * * * *